(12) United States Patent
Ferrara et al.

(10) Patent No.: US 9,041,707 B2
(45) Date of Patent: May 26, 2015

(54) CONFIRMING COMPLIANCE WITH A CONFIGURATION

(75) Inventors: Raymond Ferrara, Concord, MA (US); Weiyan Ci, Sherborn, MA (US)

(73) Assignee: RBM Technologies, Boston, MA (US)

( * ) Notice: Subject to any disclaimer, the term of this patent is extended or adjusted under 35 U.S.C. 154(b) by 148 days.

(21) Appl. No.: 13/485,706

(22) Filed: May 31, 2012

(65) Prior Publication Data

US 2013/0076726 A1   Mar. 28, 2013

Related U.S. Application Data

(60) Provisional application No. 61/492,243, filed on Jun. 1, 2011.

(51) Int. Cl.
| | | |
|---|---|---|
| G06T 1/00 | (2006.01) | |
| G06T 17/00 | (2006.01) | |
| G09G 5/00 | (2006.01) | |
| G06T 11/00 | (2006.01) | |
| G06Q 30/06 | (2012.01) | |

(52) U.S. Cl.
CPC ............... *G06T 11/00* (2013.01); *G06Q 30/06* (2013.01)

(58) Field of Classification Search
CPC ... G06Q 30/06; G06Q 10/087; G06Q 20/203; G06Q 30/0641; G06T 11/00; G06F 17/30595; G06K 7/1417
See application file for complete search history.

(56) References Cited

U.S. PATENT DOCUMENTS

| | | | | |
|---|---|---|---|---|
| 6,026,377 A * | 2/2000 | Burke | ........................... | 705/27.2 |
| 6,191,850 B1 * | 2/2001 | Chiang | ....................... | 356/237.4 |
| 6,427,132 B1 | 7/2002 | Bowman-Amuah | | |
| 7,124,101 B1 | 10/2006 | Mikurak | | |
| 2005/0203790 A1 | 9/2005 | Cohen | | |
| 2006/0161465 A1 | 7/2006 | Ramakrishnan | | |
| 2006/0265489 A1 | 11/2006 | Moore | | |
| 2007/0061211 A1 | 3/2007 | Ramer et al. | | |
| 2009/0059270 A1 * | 3/2009 | Opalach et al. | .............. | 358/1.15 |
| 2009/0119305 A1 | 5/2009 | Johnson et al. | | |
| 2010/0010968 A1 | 1/2010 | Redlich et al. | | |
| 2010/0138037 A1 | 6/2010 | Adelberg et al. | | |
| 2010/0171826 A1 * | 7/2010 | Hamilton et al. | .............. | 348/135 |
| 2011/0295764 A1 | 12/2011 | Cook et al. | | |
| 2012/0054242 A1 | 3/2012 | Ferrara et al. | | |
| 2012/0054289 A1 * | 3/2012 | Aytulu et al. | ................. | 709/206 |

(Continued)

OTHER PUBLICATIONS

Toung, DR Wal-Mart Stores, Inc.—Company Report, Dec. 8, 1997.

*Primary Examiner* — Kee M Tung
*Assistant Examiner* — Sing-Wai Wu
(74) *Attorney, Agent, or Firm* — Fish & Richardson P.C.

(57) ABSTRACT

Confirming compliance with a configuration includes: receiving information about a fixture, where the information includes a specified configuration of items to be displayed on the fixture; generating a display using the information, where the display depicts the specified configuration; presenting the display using a graphics system of a computing device; receiving an image depicting an actual configuration of the fixture; associating metadata with the image, where the metadata includes searchable data that distinguishes the fixture from at least some other fixtures of like type; sending the image, along with the metadata, over a network to a server that is remote from the computing device; and in a case that the specified configuration substantially matches the actual configuration, sending, along with the image and the metadata, a message indicating that the fixture is in compliance with the specified configuration.

33 Claims, 9 Drawing Sheets

(56) References Cited

U.S. PATENT DOCUMENTS

2012/0296777 A1 11/2012 Fugman et al.
2013/0006790 A1 1/2013 Raskin et al.
2013/0076726 A1 3/2013 Ferrara

* cited by examiner

CONFIRMING COMPLIANCE WITH A CONFIGURATION

CROSS-REFERENCE TO RELATED APPLICATION

This patent application claims priority to U.S. Provisional Application No. 61/492,243, filed on Jun. 1, 2011, the contents of which are hereby incorporated by reference into this patent application as if set forth herein in full.

TECHNICAL FIELD

This patent application relates generally to confirming that a retail merchandising fixture or other structure is in compliance with a specified configuration.

BACKGROUND

Distributors provide products to retailers for sale. Typically, a distributor will provide a number of the latest products to the retailer. The products are often provided without regard to the needs of the consumer. As a result, some of those products are sold by the retailer, and some are not. The surplus that is not sold generally cannot be sent back to the distributor. As a result, the retailer will typically put the surplus "on sale", often at a loss.

Product placement can be key in determining whether a product is sold at the retail level or whether the product remains unsold. A manufacturer may provide guidelines as to how its products are to be displayed. These guidelines may be a result of time and effort spent to determine how to achieve optimal, or at least enhanced, sales based on product placement. However, these guidelines are subject to interpretation by the retailer and local store. As a result, the actual product display at a retail location may deviate considerably from the one intended either by the manufacturer or the retailer. The manufacturer or the retailer may be unable to enforce compliance with their guidelines among retail outlets without policing the retail outlets in person. This can be impractical, particularly where there are a large number of retail outlets.

SUMMARY

This patent application describes methods and apparatus, including computer program products, for confirming that a fixture or other structure is in compliance with a specified configuration.

An example of the foregoing methods and apparatus includes: receiving information about a fixture, where the information corresponds to a configuration of items to be displayed on the fixture; generating a display using the information, where the display depicts the configuration; presenting the display using a graphics system of a computing device; receiving an image depicting an actual configuration of the fixture; associating metadata with the image, where the metadata comprises searchable data that distinguishes the fixture from at least some other fixtures of like type; sending the image, along with the metadata, over a network to a server that is remote from the computing device; and, in a case that the configuration substantially matches the actual configuration, sending, along with the image and the metadata, a message indicating that the fixture is in compliance with the configuration. The method and apparatus may include one or more of the following features, either alone or in combination.

The information may comprise a floorplan of a location that includes the fixture. The display may comprise a first display and a second display. The first display may be an image of the floorplan and may comprise an icon corresponding to the fixture. The second display may depict the floorplan and may be presented in response to selection of the icon on the first display. The server may be a first server, and the information may be received from a second server that is different from the first server. The metadata may be received from the second server. The configuration may substantially match the actual configuration if items and locations of items on the actual configuration match, to within a percentage, items and locations of items on the configuration. A process may be performed that includes determining that the configuration substantially matches the actual configuration. The determining may be performed by comparing the configuration to the actual configuration. The comparing may be performed manually. The comparing may be performed automatically by identifying items in the image depicting the actual configuration using one or more image matching processes, and by comparing attributes of the identified items to attributes of items in the configuration. In a case that the configuration does not substantially match the actual configuration, a message may be sent, to the server, indicating that the fixture is not in compliance with the configuration. The metadata may comprise data identifying at least one of the following: a type of the fixture, items on the fixture, and a location of the fixture.

Any two or more of the features described in this patent application, including in this summary section, may be combined to form embodiments not specifically described in this patent application.

All or part of the systems and techniques described herein may be implemented as a computer program product that includes instructions that are stored on one or more non-transitory machine-readable storage media, and that are executable on one or more processing devices. Examples of non-transitory machine-readable storage media include e.g., read-only memory, an optical disk drive, memory disk drive, random access memory, and the like. All or part of the systems and techniques described herein may be implemented as an apparatus, method, or electronic system that may include one or more processing devices and memory to store executable instructions to implement the stated functions.

The details of one or more implementations are set forth in the accompanying drawings and the description below. Other features, objects, and advantages will be apparent from the description and drawings, and from the claims.

DESCRIPTION OF THE DRAWINGS

Like reference numerals in different figures indicate like elements.

DETAILED DESCRIPTION

Figure 1:
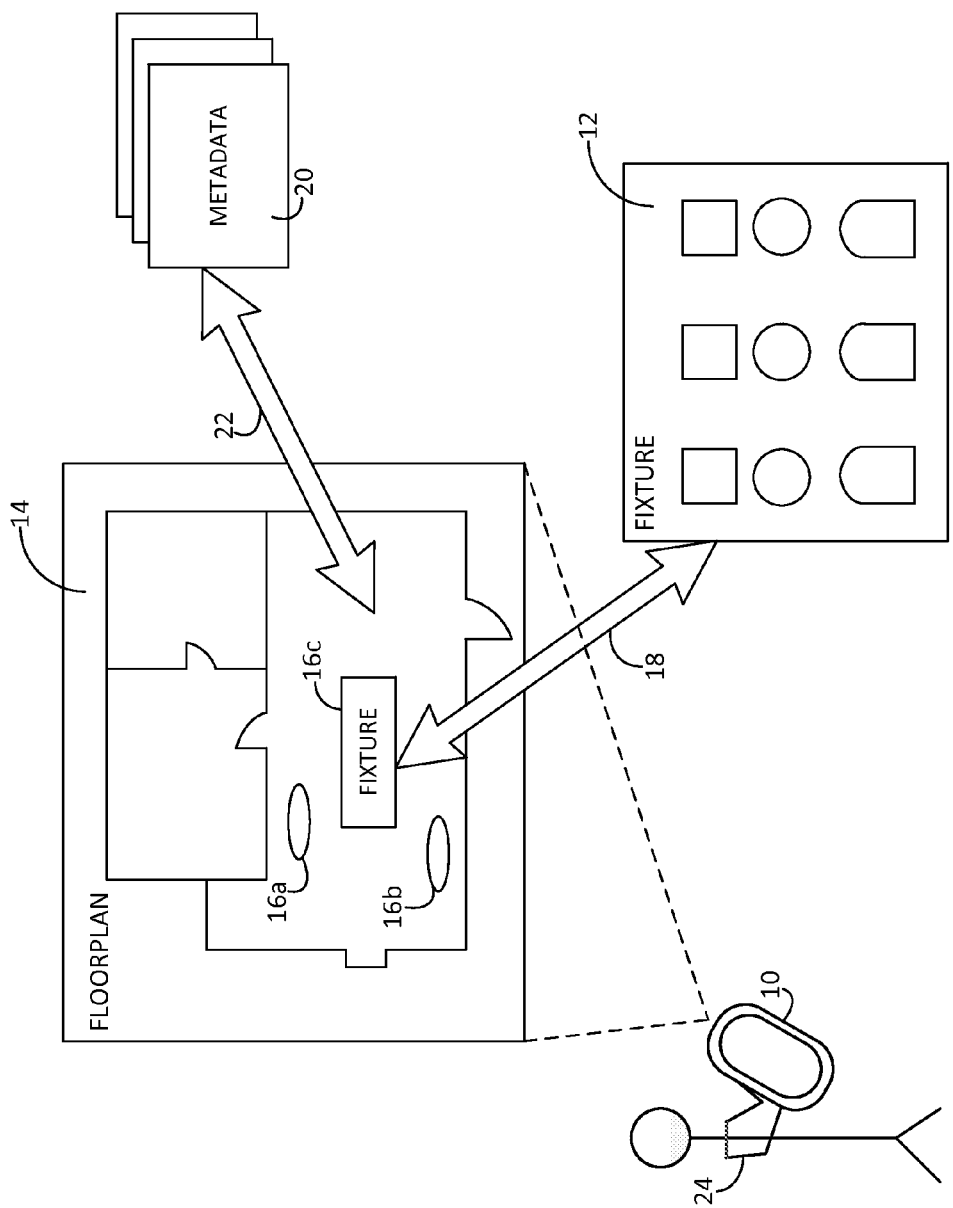
FIGS. 1 to 3 are block diagrams depicting, conceptually, the processes described herein for retrieving a specified configuration of a fixture, comparing the specified configuration to an actual configuration of the fixture, and reporting compliance, or lack thereof, of the fixture with the specified configuration.
Figure 2:
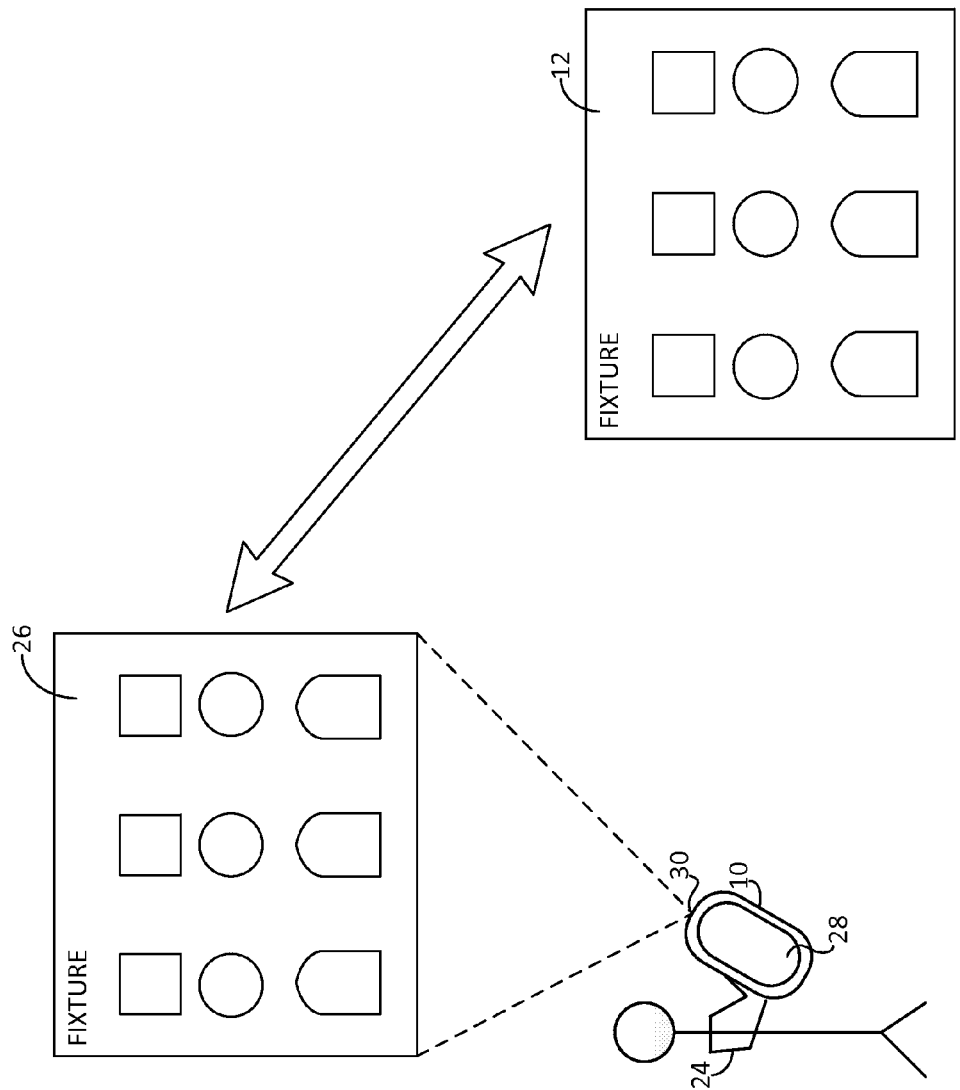
Figure 3:
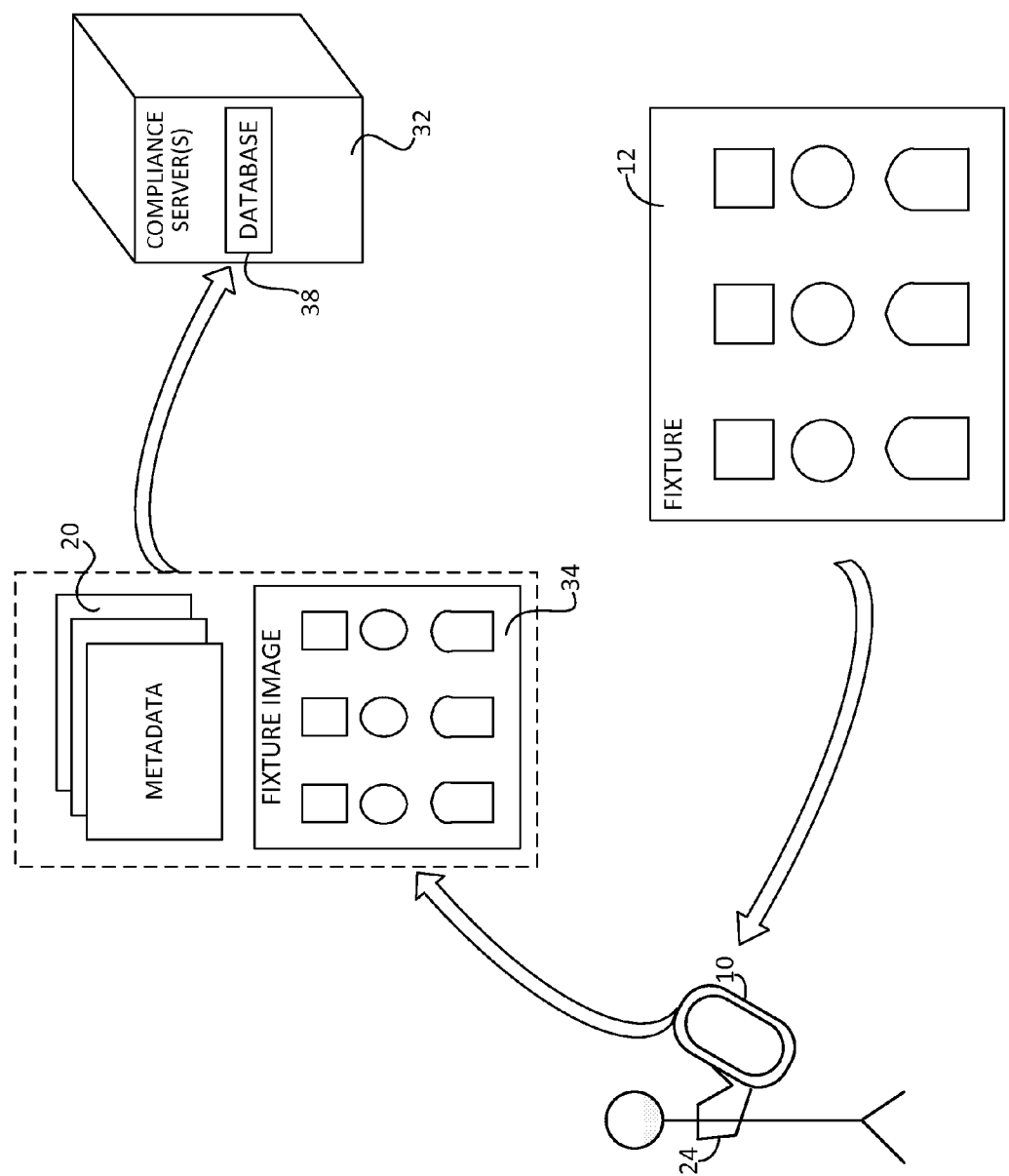

Described herein is a system for reporting that a fixture or other structure complies with specified requirements of an entity, such as a manufacturer. The system may be performed by one or more processing devices of a computing device, and may include receiving information about the fixture, such as a specified configuration of items to be displayed on the fixture. The system may also include generating a display that depicts the specified configuration using the information, presenting the display using a graphics system of the computing device, receiving an image depicting an actual configuration of the fixture, and associating metadata with the image. The metadata may include searchable data that distinguishes the fixture from at least some other fixtures of like type (e.g., identical fixtures that are configured differently, different fixtures that are configured identically, identical fixtures that are configured identically, etc.). The system may also include sending the image, along with the metadata, over a network to a compliance server that is remote from the computing device. The metadata makes images of the actual configurations searchable, e.g., by an entity that set the specified configuration. If the specified configuration substantially matches the actual configuration, the system also includes sending, along with the image and the metadata, a message indicating that the fixture is in compliance with the specified configuration. FIGS. 1 to 3, below, depict the above system conceptually.

In FIGS. 1 to 3, the cellular telephone industry is used to describe how the above system works. In this example, the products are cellular telephones and accessories, and the retail locations are stores, such as those for Verizon® and AT&T®.

Referring to FIG. 1, an example of the foregoing system may be implemented, in part, on a computing device 10. In this example, mobile computing device 10 is a tablet computer that includes an outward-facing camera. However, other types of computing devices may be used in lieu of, or in addition to, a tablet computer. In FIG. 1, fixture 12, which may be, e.g., a kiosk or a display wall, is located at a retail store. Fixture 12 displays items which, in this example, include accessories for use with cellular telephones, such as headsets, chargers, cases, and the like. Fixture 12 is configured to display these items in a manner designed to enhance sales, as described in more detail below. To this end, a specified configuration for the fixture is stored, e.g., in a server (not shown in FIG. 1) that is accessible to computing device 10 over a network. The specified configuration may be associated with a sales promotion or the like designed to promote sales of a particular item or items in general. The specified configuration may be predefined in that it is a direct representation, in the system, of the configuration of the fixture. Alternatively, data may be stored in the system that may be used to calculate or otherwise determine the specified configuration of the fixture. In this case, the data that is stored need not be a direct representation, in the system, of the configuration of the fixture. Accordingly, in the context of this application, references to storage of the specified configuration may refer to storage of data representing the specified configuration of storage of data used to generate a representation of the specified configuration.

The specified configuration may be stored in association with a floorplan 14 for a store where fixture 12 is located. Floorplan 14 may be a block diagram, as shown, having a shape that roughly represents to the shape of the corresponding store. Floorplan 14 may have metadata associated therewith, which identifies the floorplan as being for the store, and which specifies various other characteristics of the store, e.g., the location of the store, the identity of the store, the manager of the store, and the like. In this example, floorplan 14 includes icons 16a to 16c that represent fixtures in the store. The icons 16a to 16c are located at about the same location as fixtures in the store. The icons 16a to 16c may include associated hyperlinks that, when selected, display the specified (and, if available) current configuration of each corresponding fixture. In a tablet computer or other touch-screen system, a fixture icon may be selected by touching the icon.

In the example of FIG. 1, icon 16c corresponds to fixture 12, as indicated by arrow 18. Icon 16c provides access to a specified (e.g., retailer or manufacturer-specified) configuration for fixture 12. The specified configuration may include metadata 20 associated therewith, as indicated by arrow 22. Metadata 20 may be information about, e.g., the types and locations of items (e.g. products) included on the specified configuration fixture 12. The metadata associated with floorplan 14 may be part of metadata 20, and may also be associated with each fixture icon 16a to 16c (and, thus, with each specified fixture configuration).

In this example, a user 24 of computing device 10 accesses floorplan 14 via a secure Web site. User 24 selects icon 16c to display the specified configuration 26 of fixture 12 via the graphics system, including the display screen 28, of computing device 10. This is shown in FIG. 2. The actual configuration of fixture 12 is compared to the specified configuration 26 displayed on computing device 10. In the example of FIG. 2, the comparison is performed manually. That is, user 24 visually compares the specified configuration 26 to the actual configuration 12. In an alternative implementation, the comparison may be performed automatically using, e.g., image recognition code executing on computing device 10 or elsewhere on a network connected to the computing device (e.g., in a cloud computing context, this functionality would be implemented in "the cloud"). For example, user 24 may take a picture of fixture 12 using, e.g., an outward-facing camera 30 included on computing device 10. Appropriate image recognition code, in conjunction with information available on a network, such as the Internet, may be used to identify the items displayed on fixture 12, along with their locations. This information may be compared to the metadata 20 associated with the specified configuration in order to determine if the actual configuration matches the specified configuration.

In any case, if the actual configuration of fixture 12 is identical, or substantially similar, to the specified configuration, fixture 12 is deemed to be in compliance with the specified configuration. In this context, "substantially similar" may indicate that a certain percentage of items in the specified configuration are in the actual configuration and/or that a certain percentage of items in the actual configuration are at the locations in the fixture specified by the specified configuration.

Following comparison, user 24 may take a picture of the actual configuration of fixture 12 using the camera on computing device 10 (assuming that a picture has not already been taken). The resulting image may be associated with metadata for the specified configuration, and the combination sent to compliance server 32 (FIG. 3). If it has been determined that the actual configuration is compliant, then the image may be sent along with a message indicating that the actual configuration is in compliance. If it has been determined that the actual configuration is not in compliance, then the image may be sent along with a message indicating that the actual configuration is not in compliance. If available, the message may specify what, in the actual configuration, deviates from the specified configuration. In either case, the message may include appropriate metadata that is indicative of compliance or non-compliance, and that may be stored with the image.

The foregoing process is depicted conceptually in FIG. 3. Specifically, FIG. 3 shows computing device 10 taking a picture 34 ("fixture image") of the actual configuration of fixture 12, and sending the resulting image to compliance server 32. As shown in FIG. 3, metadata, such as metadata 20 or other metadata described herein, is associated with image 34. The metadata may be associated with image 34 by computing device 10. For example, computing device 10 may download the metadata and append the metadata to image 34 prior to sending image 34 to compliance server 32. Alternatively, computing device 10 may instruct a server (not shown) containing the metadata for a particular fixture to send that metadata to compliance server 32, along with a fixture-specific identifier. Computing device 10 may append that same identifier to image 34. Compliance server 32 may then associate image 34 with the appropriate metadata using the identifier. An advantage of this configuration is that it reduces the amount of processing required by computing device 10.

User 24 interacts with computing device 10 through a user interface (UI) that is generated by code that controls and/or implements the processes of FIGS. 1 to 3. The UI may include one or more fields that accept user input (e.g., a "comments" field). The user input may include any information, such as information about the store, the user, the fixture, and the like. This user-input information may be stored as metadata to be associated with an image of the fixture, e.g., with an image of the actual configuration taken by the camera.

Computing device 10 may be configured to take a picture of the actual configuration, to associate the metadata with the resulting image, and to send the image and metadata to the compliance server in response to activation of a single control on a UI displayed on computing device 10. For example, a single button or other control may be activated to cause code on the computing device to perform multiple functions automatically (e.g., without further user intervention). That is, selecting a single button on the UI may trigger the code on the UI to control a camera on the computing device to take the image of the actual configuration, to associate metadata for the specified configuration with the resulting image taken by the camera and stored on the computing device, and to send the image and metadata (with a message, if appropriate) to compliance server 32. In other implementations, this process may be more interactive. For example, the user may hit a "take a picture" button associated with the floorplan graphic, and then hit a "capture a photo" button in a subsequent UI. The resulting image and metadata may be transmitted automatically or in response to further interaction with the UI (e.g., hitting a "send" button on the UI).

Compliance server 32 stores the image of the actual configuration of the fixture in a database 38 in association with the metadata for the specified configuration. Compliance server 32 also stores, in association with the image, any other metadata, such as the time that the image has been created and any user-input information. Pointers, tables, and/or other virtual structures, may be used to make the appropriate associations.

The metadata for each image may be specific to that image, and therefore may distinguish the image from other fixture images in the database. The database is searchable using the metadata. For example, an entity that designed the specified configuration (e.g., a manufacturer of products or associated accessories) may search database 38 in order to identify an image showing the actual configuration of a fixture in order to confirm that the actual configuration of the fixture complies with the requirements of the specified configuration. A manufacturer or other entity wanting access to the compliance server's information, may maintain an account with the proprietor of compliance server 32, and access that account via a Web page hosted by compliance server 32.

Database 38 may be part of, or otherwise accessible to, compliance server 32. Database 38 may store images of fixtures, along with the associated metadata described herein. The associated metadata may include, but is not limited to, information about cellular telephones and their accessories in a fixture, attributes of a retail store associated with the fixture, locations of items on the fixture, a time at which an image was taken, and other information. Examples of information that may be included in the metadata are provided below. It is noted that an image need not have associated with it all of the information described below, and that this information is presented simply to give examples of the types of information that may be associated with an image of a fixture.

Information about a cellular telephone may include any information that identifies the cellular telephone. For example, the information may include the maker of the cellular telephone (e.g., Samsung®, Nokia®, Apple®, etc.), the model name of the cellular telephone (e.g., iPhone®, chocolate phone, Razr, etc.), the model number of the cellular telephone (e.g., SKU—stock keeping unit—number), and the type of cellular telephone (e.g., smart phone, go-phone, 3G phone). There is no limit on the amount and type of information that may be associated with an image. For example, the database may also include the colors of the cellular telephones, their cellular carriers (e.g., AT&T®, Verizon®, etc.) their primary and/or secondary functionalities (e.g., plays music), their sizes, the communication schemes that they employ (e.g., CDMA or GSM), and their ability to operate outside the United States.

Information about cellular telephone accessories may include any information that identifies accessories for use with cellular telephones. The information stored in database 38 may relate to accessories for cellular telephones that are not described in the database, but that nevertheless may be displayed. As was the case with the information about cellular telephones, the information about the accessories may include the maker of the accessories (e.g., Samsung®, Nokia®, Apple®, etc.), the type of the accessory (e.g., Bluetooth® earpieces, headphones, cases, batteries, chargers, car chargers, etc.), the model number (e.g., SKU number) of each accessory, and the identities of cellular telephones with which each accessory will work. There is no limit on the amount and type of information about accessories that may be associated with an image. For example, the database may also include the colors of the accessories, cellular carriers (e.g., AT&T®, Verizon®, etc.) associated with the accessories, their functionalities, their sizes, and the like.

Attributes of retail stores may include any information that identifies characteristics of a retail store at which cellular telephones and/or accessories therefor are sold. In this regard, each retail store may have a profile, which may be stored in database 38, and which contains the attributes associated with that retail store. The attributes may include the geographic location of the store (e.g., country, city, state, neighborhood, street address), the capacity of the store to sell product (e.g., capacity to display 50 cellular telephones and 150 corresponding accessories), the demographics of people who frequent the store (e.g., college students, young professionals, senior citizens), and the layout of the store, such as the positioning (relative or absolute) of display areas for cellular telephones and accessories vis-à-vis other features of the store, such as a checkout area or service desk. There is no limit on the amount and type of attributes that may be associated with an image. For example, the attributes may also identify the physical size of the store, other types of products (e.g., non-cellular-related) that are sold by the store, the rate of inventory turn-over of the store, the sales volume of the store, a break-down of sales by cellular telephone, accessory, or other product, and any other attributes that further characterize the store.

Information about the layout of the fixture may include a unique identifier for the fixture. The unique identifier for the fixture may be unique among all fixtures in the database, or it may be unique among fixtures at the subject retail location. Alternatively, two (or more) identifiers such as these may be associated with each fixture. The information about the layout may also identify which products are located at particular locations on the fixture (along with their associated metadata described above), possible alternatives for particular products, times periods during which those products are to be displayed, and the like. Basically, any appropriate information may be included in the metadata.

As noted above, a fixture may be configured to display items in a manner designed to enhance sales of those items. To this end, the specified configuration may be designed in accordance with one or more rules for selecting and arranging cellular telephones and their accessories in fixtures in retail stores, templates of fixtures (e.g., kiosks or display walls) within the retail stores, and filters that may limit (or, in some cases, expand) layout of products within one or more retail stores. Code for designing the specified configuration may be executed by the same server(s), site(s), or entity(ies) that provide the floorplans and metadata described above (e.g., floorplan 14 in FIG. 1). An example of such a server is server 40 of FIG. 4, which is described below.

In the cellular telephone example, rules are used for selecting and arranging cellular telephones and their accessories on fixtures in a retail store. The rules may be fixture-specific, meaning that they pertain to a particular fixture or type of display fixture, or they may be generic and simply applied to a particular fixture, type of display fixture, or the store in general. For example, rules may state that a particular type of cellular telephone is to be located at a particular location on a fixture (e.g., iPhones® always must be located on the far right of a fixture), that there must be no more than a particular number of cellular telephones on a fixture (e.g., a fixture must not contain more than five LG® chocolate phones), that the fixture may not contain two types of cellular telephones from the same manufacturer, that accessories for a particular manufacturer must be proximate (e.g., below) a particular cellular telephone from that same manufacturer, and that only accessories used with a particular cellular telephone may be displayed proximate (e.g., below) that cellular telephone. Rules may also specify, e.g., that a particular brand or type of cellular telephone is to be given priority over other cellular telephones in a group (e.g., the priority cellular telephone is to be given the best display position on a fixture), that particular types, colors or brands of cellular telephones are to be grouped for display, and that sub-groups of cellular telephones within a group are to have specific display characteristics. Layouts may then be limited/dictated by this information, regardless of fixture. There is no limit on the amount and type of rules that may be included in the database. Rules may be added, deleted or modified.

Rules for arranging cellular telephone accessories may be similar to those for arranging cellular telephones. The rules for arranging accessories may also specify spatial relationships of accessories to corresponding cellular telephones. For example, a rule may specify that a certain number of iPhone® accessories (e.g., two) must be placed directly below a corresponding iPhone® on a fixture. Another rule may specify what those accessories must be, e.g., a case, a Bluetooth® headset, etc. Another rule may specify who the manufacturers of those accessories must be, e.g., only Belkin® accessories. As was the case with cellular telephone rules, there is no limit on the amount and type of rules that may be included in the database. Rules may be added, deleted or modified.

The server that stores the rules may also include a database. The database may store templates for fixtures within retail stores. The templates contain placeholders, which specify where, on the fixture, cellular telephone(s) and/or accessory(ies) may be placed. The templates are, essentially, physical layouts of display areas of corresponding fixtures, with placeholders substituted for actual products, here cellular telephones and their accessories. In an example, a template is stored for every type of fixture used in a retail stores identified in the database. Each template may contain metadata that associates it with one or more of those retail stores. Templates may also be stored for portions of fixtures, thereby allowing the system to dictate display on only that portion of a fixture, leaving the remainder of the fixture's display to the retail owner's discretion.

The same server(s) that stores rules and template may also stores filters that may place further restrictions on product distribution and placement. For example, the filters may take into account retail store attributes and cellular telephone and accessory information to determine (e.g., limit or expand) which cellular telephones and accessories can be displayed in a particular retail store. For example, currently, West Virginia does not have 3G network coverage. Accordingly, a server may contain a filter that limits retail stores located in West Virginia to non-3G cellular telephones. Another filter might require that retail stores in areas populated predominantly by students receive cellular telephones that have entertainment features, e.g., that are capable of playing music, or not receive primarily business-oriented cellular telephones. Another filter might require that retail stores in low-income areas receive lower-cost cellular telephones or not receive cellular telephones whose cost is above a certain level. Another filter might require that retail stores in areas frequented by businesspeople receive a higher proportion of Blackberry® phones and their accessories. Another filter might require that stores in Massachusetts should receive a particular type of phone, such as an iPhone®. There is no limit on the amount and type of filters that may be included in the database. Filters may be added, deleted or modified.

Filters may also be specified for accessories. In an example, the filters refer to attributes of locations or lists of locations. For example, a filter might identify a town as a university town. Another filter might require that a higher percentage of car chargers be sent to stores located in Los Angeles than to stores located in Boston. As was the case above, there is no limit on the amount and type of filters that may be included in the database. Filters may be added, deleted or modified.

Figure 4:
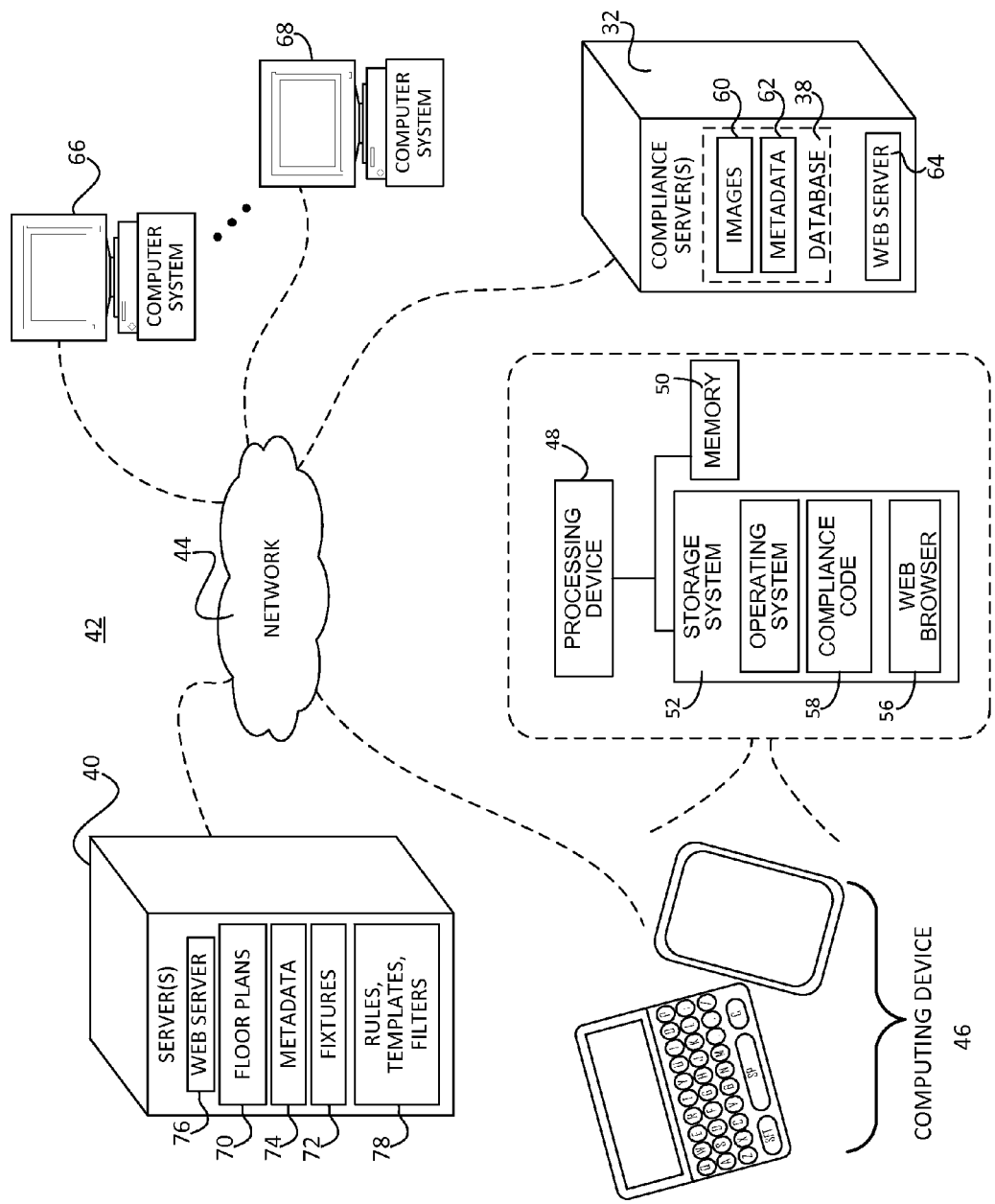
FIG. 4 is a block diagram of a network system on which the processes depicted conceptually in FIGS. 1 to 3 may be implemented.

FIG. 4 is a block diagram of an example of a system 42 on which the processes of FIGS. 1 to 3 may be implemented. System 42 includes one or more computing devices, one or more servers, and a network 44, over which the elements of FIG. 4. may interact. Also shown in FIG. 4 are computer systems, which may be maintained by manufacturers or other entities that have accounts with a compliance server 32.

A computing device 46 may be, or include, a mobile computing device such as a tablet computer having an outward-facing camera or other image capture system. In this context, "outward-facing" refers to a camera on the back of, or non-display side of, the computing device. However, computing device 46 is not limited to a tablet computer, but rather may include other types of computing devices, such as a cellular telephone (e.g., a feature phone or a smartphone), a desktop computer, a laptop computer, a handheld computer, a network appliance, a camera, an enhanced general packet radio service (EGPRS) mobile phone, a media player, a navigation device, an electronic mail (e-mail) device, a game console, an electronic reader, or a combination of any two or more of these data processing devices or other data processing devices. The computing device has a built-in camera that is outward facing; however, that is not a requirement. Instead, the computing device may have any way of connecting to, or receiving images from, a device capable of taking a picture of a fixture. In this context, "images" includes all appropriate types of still image or video. Computing device 46 may be the same as computing device 10 of FIGS. 1 to 3.

Computing device 46 includes one or more processing devices 48, memory 50 and a storage system 52. Storage system 52 can store an operating system (OS) 54, and a Web browser 56, such as GOOGLE CHROME™ or MICROSOFT INTERNET EXPLORER®, for accessing servers 32 and 40. Storage system 52 can also store computer code 52, such as an application. The application may be for performing at least some of the functions described with respect to FIGS. 1 to 3 and 5 (below), or for interacting with a remote application capable of performing at least some of those functions.

Each server can represent various forms of servers, such as a Web server, an application server, a proxy server, a network server, or a server farm. Each server can also include, or be associated with, one or more data repositories (not shown separately) for storing information regarding fixtures, their configurations, metadata, rules and filters for configuring fixtures, and any code for performing the processes described herein.

In this example, server 32 corresponds to the compliance server of FIGS. 1 to 3. Server 32 includes database 38 for storing images 60 of fixtures and associated metadata 62 provided, e.g., by computing device 46 and others like it. Server 32 also stores Web server code 64, through which this information may be accessible, via network 44, to other entities, such as computer systems 66 to 68. In this example server 40 stores information for floorplans 70, information for fixtures 72, and metadata 74 including information about, among other things, the specified configurations of the fixtures. Server 40 also stores a Web server 76 that makes this information accessible to entities on network 44 using, e.g., Web services. Server 40 may also store executable code to implement at least some of the functionality described with respect to FIGS. 1 to 3 and 5. In this regard, in an example, that functionality may be implemented via a Web-based application executed by server 40, or that functionality may be implemented via computer code executing on computing device 46. In any case, there may be an interaction between code on computing device 46 and code on server 40 in order to implement some or all of the functionality described herein. Server 40 may also store the rules, filters and templates 78 described above.

Each server can include one or more processing devices, memory and a storage system, which may be similar to that depicted in FIG. 4 for computing device 46. The storage system can include an operating system (OS) and a Web server program, such as those described above. The storage system may include a repository that stores a database with information appropriate for that server.

Network 44 can represent one or more communications networks that can allow devices (e.g., the computing devices and servers of FIGS. 1 to 4) to effect wired or wireless communication through a communication interface (not shown), which may include digital signal processing circuitry, where necessary. Network 44 can include one or more networks available for use by the computing devices, including location area networks (LANs) and the Internet. The network(s) may provide for communications under various modes or protocols, such as Internet Protocol (IP), Global System for Mobile communication (GSM) voice calls, Short Message Service (SMS), Enhanced Messaging Service (EMS), Multimedia Messaging Service (MMS) messaging, Code Division Multiple Access (CDMA), Time Division Multiple Access (TDMA), Personal Digital Cellular (PDC), Wideband Code Division Multiple Access (WCDMA), CDMA2000®, or General Packet Radio System (GPRS), among others. In an example, network communication may occur through a radio-frequency transceiver. In addition, short-range communication may occur, such as using a Bluetooth®, Wi-Fi®, or other such transceiver.

Computer systems 66 to 68 may include any appropriate type of computer system that is capable of accessing compliance server over network 44. For example, computer systems 66 to 68 may be the same as, or similar to, computer system 46. Computer systems 66 to 68 may also include one or more servers, which may be similar in structure to servers 32 and 40, and one or more mainframe computers (not shown) that provide network access.

Figure 5:
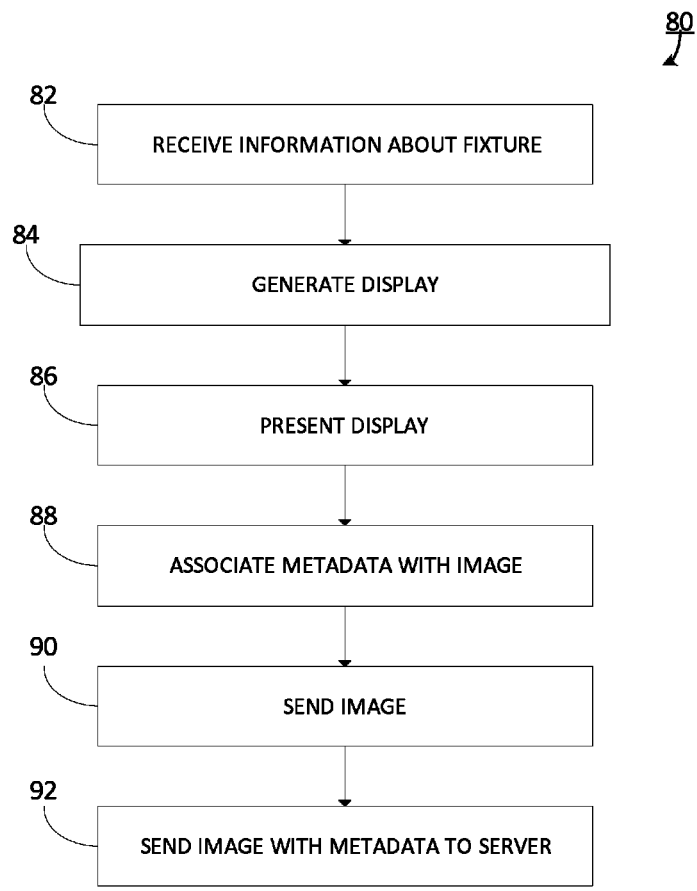
FIG. 5 is a flowchart showing an example of the processes depicted in FIGS. 1 to 3.

FIG. 5 is a flowchart showing an example of a process 80 for reporting compliance of a fixture with a specified configuration set, e.g., by an owner of the fixture. Process 80 may be an implementation of the processes depicted graphically in FIGS. 1 to 3. Referring also to FIG. 4, in this example, process 80 is performed by code executing on computing device 46. As noted, however, in other implementations, at least part of process 80 may be performed by code executing on server 40 or on other device(s) in network or direct communication with computing device 46.

Process 80 receives (82) information relating to a fixture. In this example, the information includes a floorplan showing a layout of a retail location containing the fixture. The floorplan includes one or more selectable icons, at least one of which corresponds to a fixture of interest in the floorplan. Information is associated with this icon. The information, in this example, includes a specified configuration of items to be displayed on the fixture. The specified configuration may be set by an owner of the fixture or by a manufacturer of items on the fixture, and may be generated, e.g., on server 40, in accordance with one or more rules that are written to enhance sales of items on the fixture. As noted, the specified configuration may specify which items are to be included on the fixture and an arrangement of those items on the fixture. The specified configuration may also include associated metadata, e.g., of the type described herein. For example, the metadata may include information about fixtures that are displayed in the specified configuration.

Process 80 generates (84) a display using the information. The display includes data defining an image of the floorplan, along with icons corresponding to fixtures. In this example, the display is presented (86) using a graphics system of computing device 46. For example, the display may be presented on a liquid crystal (LCD) display or any other type of display available on a tablet computer.

One of the icons on the display may be selected to display the specified configuration of the corresponding fixture. The specified configuration may include images of items that are supposed to be included on the fixture. The data may specify block diagram form with labels for items, or the data may specify computer-generated graphic(s) of the fixture and items, with written labels, if appropriate. Process 80 presents (86) (e.g., renders) the display to depict the fixture in its specified configuration. The specified configuration of the fixture displayed on the computing device may be compared to the actual configuration of the computing device (12 in FIG. 1).

Figure 6:
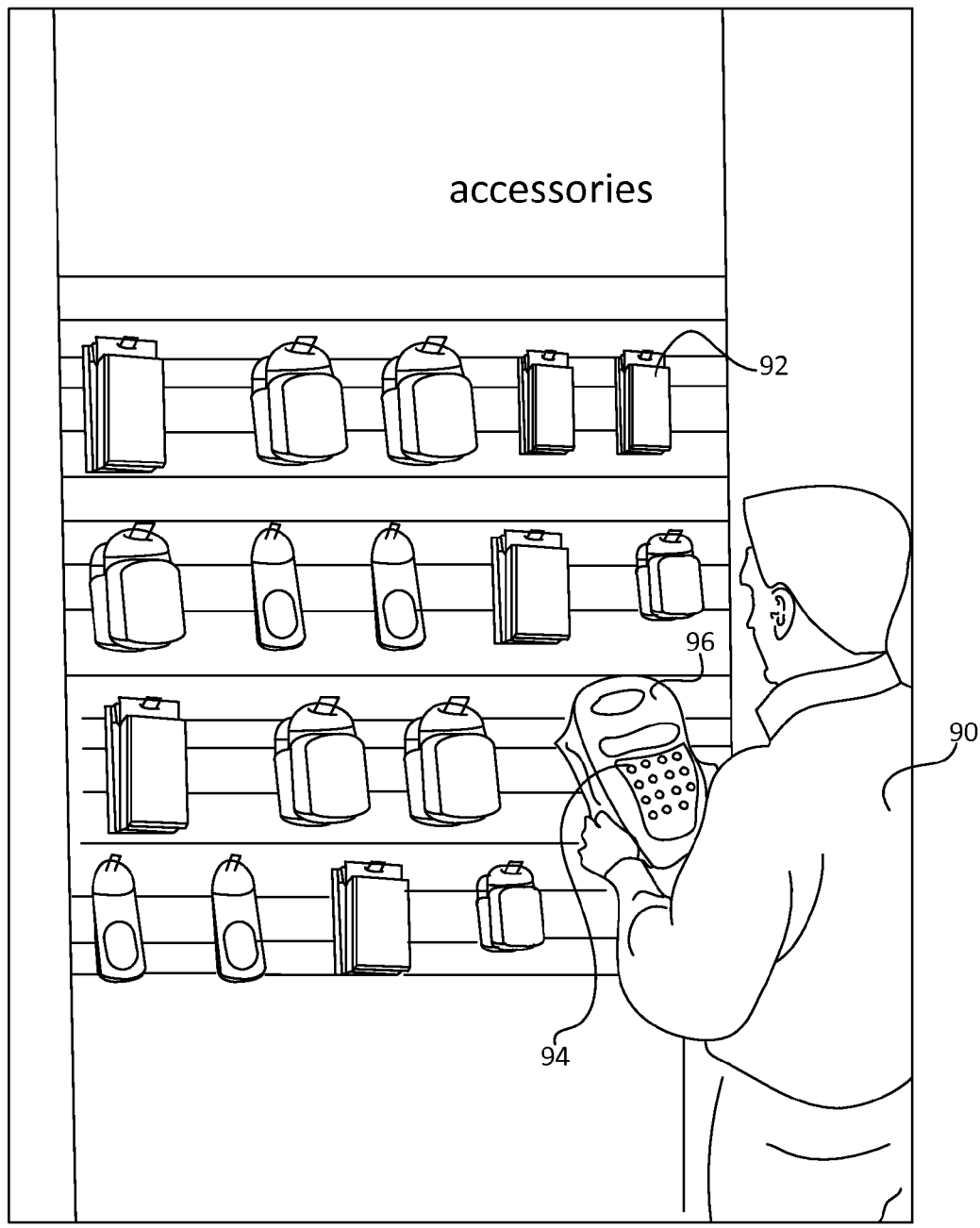
FIG. 6 is an example of an actual configuration of a fixture and of a user comparing a specified configuration of the fixture to the actual configuration.

More specifically, as described above, a user may visually compare the specified configuration of the display to the actual configuration, and make a mental determination as to whether the two match or are similar enough that the actual configuration is acceptable (e.g., a certain number of items are in the correct location on the fixture, even though others are not). This is depicted in FIG. 6, in which a user 90 compares an actual configuration of a fixture 92 to a specified configuration 94 displayed on a computing device 96. In other implementations, image recognition code, which may run on computing device 46 or server 40, may be implemented to recognize the fixture and the items displayed thereon in the actual configuration. A computer-generated match may be achieved by comparing metadata of the identified images to metadata associated with the specified configuration.

In any case, after it is determined whether the specified configuration and the actual configuration match, or are similar enough that the actual configuration is acceptable, process 80 receives an image depicting an actual configuration of the fixture. In an example, the tablet computer takes a picture of the actual configuration of the fixture. Process 80 associates (88) metadata for the specified configuration with the picture (image) taken of the actual configuration. As noted, the metadata, in this example, is searchable data that distinguishes the fixture from at least some other fixtures of like type, and that enables a user accessing the database in compliance server to search for, and identify, the image.

Process 80 sends (92) the image, along with the metadata, over a network to compliance server 32, which is remote from the computing device in this example, but may be local to the computing device in other examples. Compliance server 32 stores the image in its database, along with the received, associated, searchable metadata. Computer systems 66 to 68 may thereafter search for a fixture by searching the metadata, and retrieve, as a result, an image showing the actual configuration of the fixture at a particular time. In this way, an owner of the fixture may confirm that the fixture is a compliant fixture. In a case that the specified configuration substantially matches the actual configuration, process 80 may send, along with the image and the metadata, a message indicating that the fixture is in compliance with the specified configuration. In a case that the specified configuration does not substantially match the actual configuration, process 80 may send, to server 32 a message indicating that the fixture is not in compliance with the specified configuration.

As noted above, a single button or other control on a UI of computing device 46 may be activated to cause the computing device to perform multiple functions automatically (e.g., without further user intervention). That is, code for controlling UI functions may be configured so that selecting a single button on the UI triggers the computing device to take the image of the actual configuration, associate metadata for the specified configuration with the resulting image, and send the image and metadata (with a message, if appropriate) to compliance server 32. In other implementations, the process may be more interactive. For example, the user may hit a "take a picture" button associated with a floorplan graphic, and then hit a "capture a photo" button in a subsequent UI. The resulting image and metadata may be transmitted automatically or in response to further interaction with the UI on the computing device (e.g., hitting a "send" button on the UI).

Figure 7:
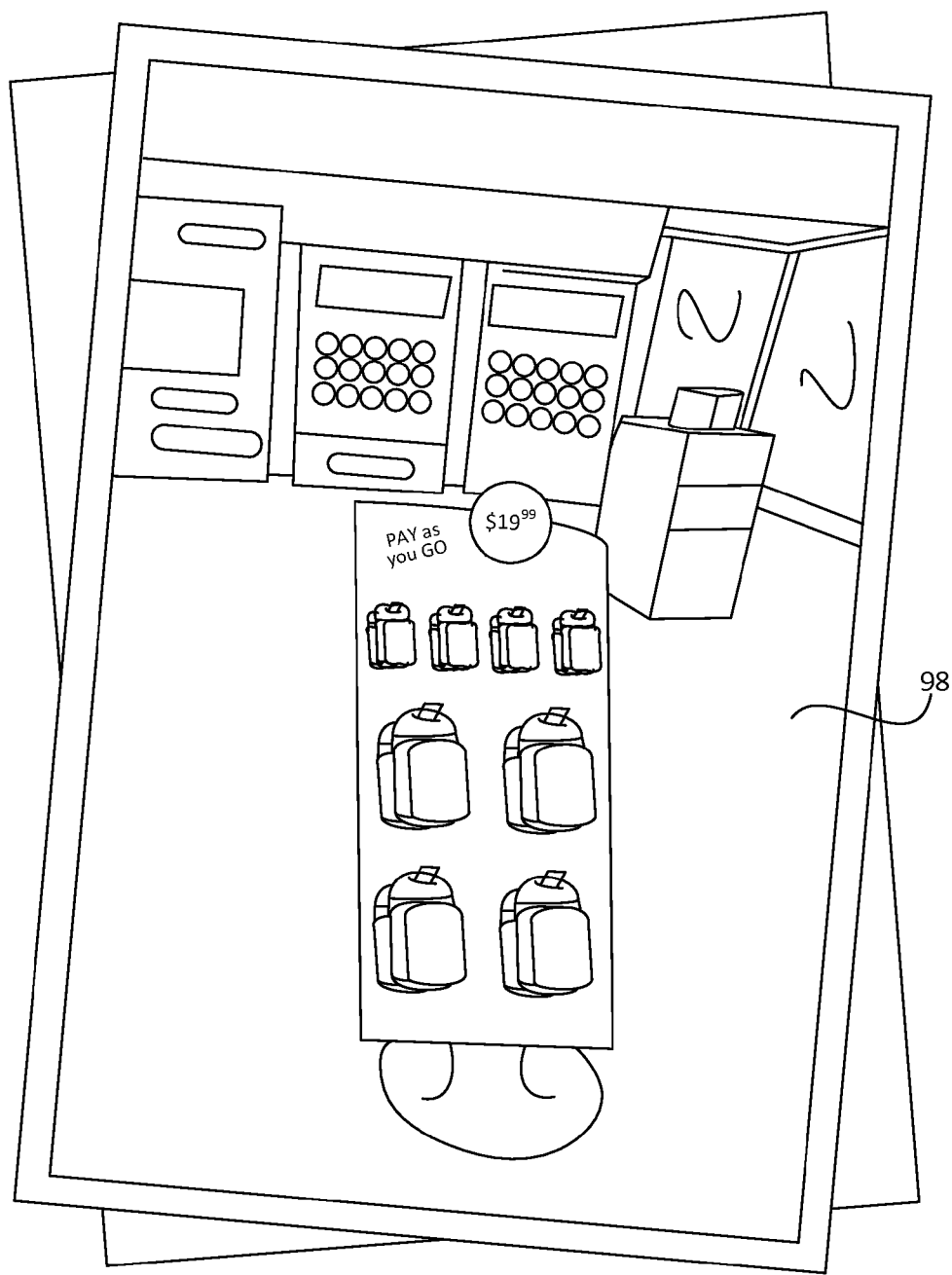
FIG. 7 is an example of an image of an actual configuration of a fixture.
Figure 8:
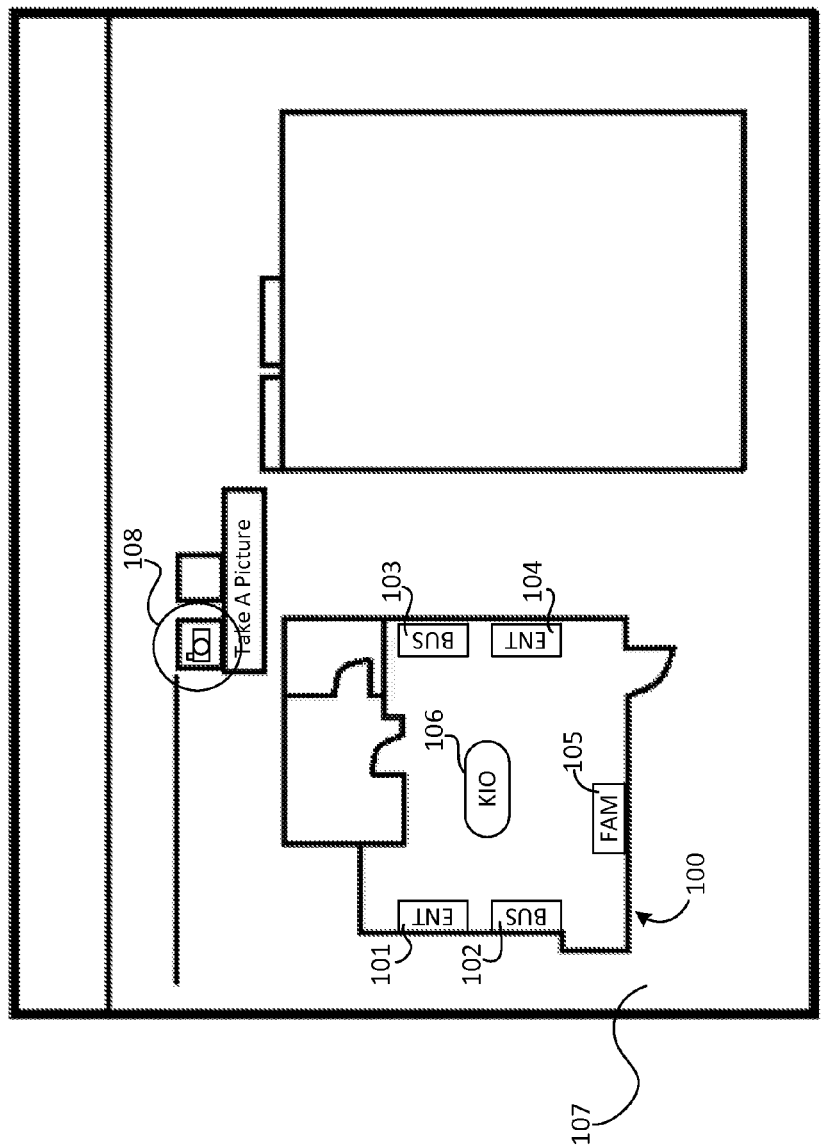
FIG. 8 is a user interface (UI) showing a floorplan and fixture icons.
Figure 9:
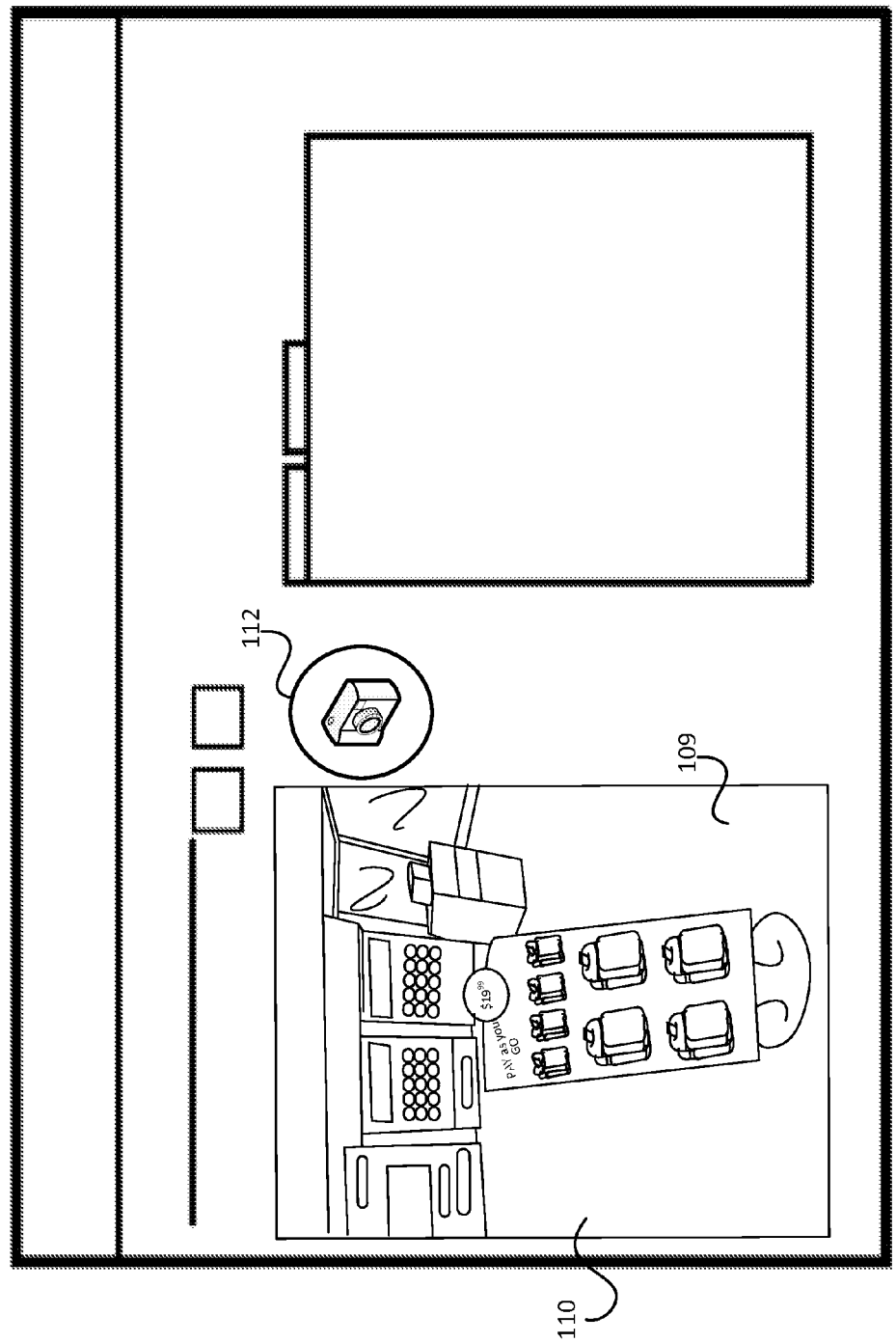
FIG. 9 is a UI showing an image of an actual configuration of a fixture that was included in the floorplan of FIG. 8.

FIG. 7 is an example of a picture 98 of an actual configuration of a fixture, which may be taken by computing device 46 in order to report compliance with a manufacturer's requirements. FIG. 8 is an example of a floorplan 100 displayed on the UI of, e.g., computing device 46. As can be seen, floorplan 100 includes flashing icons 101 to 106 corresponding to fixtures that are present at a location depicted by floorplan 100 and the require updating or checking. The UI 107 of FIG. 8 includes a control 108 instructing the system to take a picture of the actual configuration of a fixture. FIG. 9 shows the actual configuration of the fixture 109 displayed on UI 110 (in an example, UI 110 may be arrived at from UI 107 of FIG. 8). Control 112 instructs the system to capture a picture of the fixture, to associate metadata with the picture (e.g., an identity of the promotion for the fixture, a location of the fixture, and the current time and date), and to send that image to a compliance server.

All or part of the processes described herein and their various modifications (hereinafter referred to as "the processes") can be implemented, at least in part, via a computer program product, i.e., a computer program tangibly embodied in one or more information carriers, e.g., in one or more tangible machine-readable storage media, for execution by, or to control the operation of, data processing apparatus, e.g., a programmable processor, a computer, or multiple computers. An example of a computer program used to implement the processes described herein is an application (or "app") for a tablet computer, a smartphone, or any other appropriate computing device.

A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a network.

Actions associated with implementing the processes can be performed by one or more programmable processors executing one or more computer programs to perform the functions of the calibration process. All or part of the processes can be implemented as, special purpose logic circuitry, e.g., an FPGA (field programmable gate array) and/or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only storage area or a random access storage area or both. Elements of a computer (including a server) include one or more processors for executing instructions and one or more storage area devices for storing instructions and data. Generally, a computer will also include, or be operatively coupled to receive data from, or transfer data to, or both, one or more machine-readable storage media, such as mass storage devices for storing data, e.g., magnetic, magneto-optical disks, or optical disks.

Machine-readable storage media suitable for embodying computer program instructions and data include all forms of non-volatile storage area, including by way of example, semi-conductor storage area devices, e.g., EPROM, EEPROM, and flash storage area devices; magnetic disks, e.g., internal hard disks or removable disks; magneto-optical disks; and CD-ROM and DVD-ROM disks.

The term "machine-readable storage media" is not meant to encompass non-statutory subject matter as defined at the time the attached claims are construed. The term "machine-readable storage media", however, is meant to cover any subject matter which is defined as statutory at the times the claims are construed.

Each computing device, such as a tablet computer, may include a hard drive for storing data and computer programs, and a processing device (e.g., a microprocessor) and memory (e.g., RAM) for executing computer programs. Each computing device may include an image capture device, such as a still camera or video camera. The image capture device may be built-in or simply accessible to the computing device.

Each computing device, may include a graphics system, including a display screen. A display screen, such as an LCD or a CRT (Cathode Ray Tube) displays, to a user, images that are generated by the graphics system of the computing device. As is well known, display on a computer display (e.g., a monitor) physically transforms the computer display. For example, if the computer display is LCD-based, the orientation of liquid crystals can be changed by the application of biasing voltages in a physical transformation that is visually apparent to the user. As another example, if the computer display is a CRT, the state of a fluorescent screen can be changed by the impact of electrons in a physical transformation that is also visually apparent. Each display screen may be touch-sensitive, allowing a user to enter information onto the display screen via a virtual keyboard. On some computing devices, such as a desktop or smartphone, a physical keyboard and scroll wheel may be provided for entering information onto the display screen. Each computing device, and computer programs executed thereon, may also be configured to accept voice commands, and to perform functions in response to such commands. For example, the process described herein may be initiated at a client, to the extent possible, via voice commands.

Elements of different embodiments described herein may be combined to form other embodiments not specifically set forth above. Elements may be left out of the processes, computer programs, Web pages, etc. described herein without adversely affecting their operation. Furthermore, various separate elements may be combined into one or more individual elements to perform the functions described herein. For servers 32 and 40 may be the same server or part of the same group of servers.

The foregoing implementations describe use of the system in the placement of cellular telephones and their accessories. However, the system described herein may be used to confirm compliance of any product or promotional element within any retail location, or more generally, any appropriate item on any appropriate structure. For example, the system may be used to confirm compliance of other types of electronics, clothing, food, shoes, automobile accessories, furniture, toiletries, etc. on retail displays. The system likewise may be used with any type of retail location, whether generalized, such as Wal-Mart®, or specialized, such as the cellular telephone outlets described herein.

The systems and techniques described herein may be used in connection with the systems and techniques described in U.S. patent application Ser. No. 12/788,456, filed May 27, 2010, and entitled GENERATING A LAYOUT OF PRODUCTS, the contents of which are hereby incorporated by reference into this patent application as if set forth herein in full.

Other implementations not specifically described herein are also within the scope of the following claims.

What is claimed is:

1. A method performed on a computing device, comprising:
   receiving information about a fixture, the information corresponding to a predefined configuration of items to be displayed on the fixture;
   generating, on the computing device, data for a display using the information, the display depicting the predefined configuration;
   presenting the display based on the data using a graphics system of the computing device;
   receiving an image depicting an actual configuration of the fixture;
   comparing the actual configuration to the predefined configuration to produce a comparison result;
   based on the comparison result, instructing a first server to send metadata to a compliance server, the metadata comprising searchable data that distinguishes the fixture from at least some other fixtures of like type, the metadata identifying at least some of the items in the actual configuration;
   responsive to input received on the display, sending data for the image over a network to the compliance server, the compliance server being remote from the computing device; and
   in a case that the actual configuration is deemed acceptable based on the comparison result, sending, to the compliance server, a message indicating that the fixture is in compliance with the predefined configuration.

2. The method of claim 1, wherein the information comprises a floorplan of a location that includes the fixture; and
   wherein the display comprises a first display and a second display, the first display being an image of the floorplan and comprising an icon corresponding to the fixture, the second display depicting the fixture and being presented in response to selection of the icon on the first display.

3. The method of claim 1, wherein the predefined configuration matches the actual configuration if at least some items and locations of at least some items on the actual configuration match at least some items and locations of at least some items on the predefined configuration.

4. The method of claim 1, further comprising:
   in a case that the actual configuration is deemed not acceptable, sending, to the server, a message indicating that the fixture is not in compliance with the predefined configuration.

5. The method of claim 1, wherein the metadata comprises data identifying at least one of the following: a type of the fixture, items on the fixture, and a location of the fixture.

6. One or more non-transitory machine-readable media storing instructions that are executable by one or more processing devices of a computing device to perform operations comprising:
   receiving information about a fixture, the information corresponding to a predefined configuration of items to be displayed on the fixture;
   generating, on the computing device, data for a display using the information, the display depicting the predefined configuration;
   presenting the display based on the data using a graphics system of the computing device;

receiving an image depicting an actual configuration of the fixture;

comparing the actual configuration to the predefined configuration to produce a comparison result;

based on the comparison result, instructing a first server to send metadata to a compliance server, the metadata comprising searchable data that distinguishes the fixture from at least some other fixtures of like type, the metadata identifying at least some of the items in the actual configuration;

responsive to input received on the display, sending data for the image over a network to the compliance server, the compliance server being remote from the computing device; and in a case that the actual configuration is deemed acceptable based on the comparison result, sending, to the compliance server, a message indicating that the fixture is in compliance with the predefined configuration.

7. The one or more non-transitory machine-readable media of claim 6, wherein the information comprises a floorplan of a location that includes the fixture; and wherein the display comprises a first display and a second display, the first display being an image of the floorplan and comprising an icon corresponding to the fixture, the second display depicting the fixture and being presented in response to selection of the icon on the first display.

8. The one or more non-transitory machine-readable media of claim 6, wherein the predefined configuration matches the actual configuration if at least some items and locations of at least some items on the actual configuration match at least some items and locations of at least some items on the predefined configuration.

9. The one or more non-transitory machine-readable media of claim 6, wherein the operations further comprise:

in a case that the actual configuration is deemed not acceptable, sending, to the server, a message indicating that the fixture is not in compliance with the predefined configuration.

10. The one or more non-transitory machine-readable media of claim 6, wherein the metadata comprises data identifying at least one of the following: a type of the fixture, items on the fixture, and a location of the fixture.

11. A system comprising:

memory storing instructions that are executable;

a graphics system for rendering images on a computer display screen; and one more processing devices to execute the instructions to perform operations comprising:

receiving information about a fixture, the information corresponding to a predefined configuration of items to be displayed on the fixture;

generating, on the one or more processing devices, data for a display using the information, the display depicting the predefined configuration;

presenting the display based on the data using the graphics system;

receiving an image depicting an actual configuration of the fixture;

comparing the actual configuration to the predefined configuration to produce a comparison result;

based on the comparison result, instructing a first server to send metadata to a compliance server, the metadata comprising searchable data that distinguishes the fixture from at least some other fixtures of like type, the metadata identifying at least some of the items in the actual configuration;

responsive to input received on the display, sending data for the image over a network to the compliance server, the compliance server being remote from the computing device; and in a case that the actual configuration is deemed acceptable based on the comparison result, sending, to the compliance server, a message indicating that the fixture is in compliance with the predefined configuration.

12. The system of claim 11, wherein the information comprises a floorplan of a location that includes the fixture; and wherein the display comprises a first display and a second display, the first display being an image of the floorplan and comprising an icon corresponding to the fixture, the second display depicting the fixture and being presented in response to selection of the icon on the first display.

13. The system of claim 11, wherein the predefined configuration matches the actual configuration if at least some items and locations of at least some items on the actual configuration match at least some items and locations of at least some items on the predefined configuration.

14. The system of claim 11, wherein the operations further comprise:

in a case that the actual configuration is deemed not acceptable, sending, to the server, a message indicating that the fixture is not in compliance with the predefined configuration.

15. The system of claim 11, wherein the metadata comprises data identifying at least one of the following: a type of the fixture, items on the fixture, and a location of the fixture.

16. A method performed by a computing device, comprising:

receiving information about a fixture, the information corresponding to a predefined configuration of items to be displayed on the fixture;

generating, on the computing device, data for a display using the information, the display depicting the predefined configuration and comprising a user interface, the user interface comprising a control configured to trigger multiple operations automatically;

presenting the display based on the data using a graphics system of the computing device;

responsive to activation of the control, performing the multiple operations automatically, the multiple operations comprising:

controlling a camera associated with the computing device to capture an image depicting an actual configuration of the fixture;

associating metadata with the image, the metadata comprising searchable data that distinguishes the fixture from at least some other fixtures of like type, the metadata identifying at least some of the items in the actual configuration; and sending the image, along with the metadata, over a network to a server that is remote from the computing device; and sending, along with the image and the metadata, a message indicating whether the fixture is in compliance with the predefined configuration, the message being based on locations of at least some of the items in the actual configuration and locations of at least some of the items in the predefined configuration.

17. The method of claim 16, wherein the server is a first server, and the information is received from a second server that is different from the first server; and wherein the method further comprises receiving the metadata from the second server.

18. The method of claim 16, further comprising determining that the predefined configuration matches at least part of the actual configuration.

19. The method of claim 18, wherein determining is performed by comparing the predefined configuration to the actual configuration.

20. The method of claim 19, wherein comparing is performed manually.

21. The method of claim 19, wherein comparing is performed automatically by identifying items in the image depicting the actual configuration using one or more image matching processes, and by comparing attributes of the identified items to attributes of items in the predefined configuration.

22. One or more non-transitory machine-readable media storing instructions that are executable by one or more processing devices of a computing device to perform operations comprising:
- receiving information about a fixture, the information corresponding to a predefined configuration of items to be displayed on the fixture;
- generating, on the computing device, data for a display using the information, the display depicting the predefined configuration and comprising a user interface, the user interface comprising a control configured to trigger multiple operations automatically;
- presenting the display based on the data using a graphics system of the computing device;
- responsive to activation of the control, performing the multiple operations automatically, the multiple operations comprising:
  - controlling a camera associated with the computing device to capture an image depicting an actual configuration of the fixture;
  - associating metadata with the image, the metadata comprising searchable data that distinguishes the fixture from at least some other fixtures of like type, the metadata identifying at least some of the items in the actual configuration; and
  - sending the image, along with the metadata, over a network to a server that is remote from the computing device; and
- sending, along with the image and the metadata, a message indicating whether the fixture is in compliance with the predefined configuration, the message being based on locations of at least some of the items in the actual configuration and locations of at least some of the items in the predefined configuration.

23. The one or more non-transitory machine-readable media of claim 22, wherein the server is a first server, and the information is received from a second server that is different from the first server; and
wherein the operations further comprise receiving the metadata from the second server.

24. The one or more non-transitory machine-readable media of claim 22, wherein the operations further comprise determining that the predefined configuration matches at least part of the actual configuration.

25. The one or more non-transitory machine-readable media of claim 24, wherein determining is performed by comparing the predefined configuration to the actual configuration.

26. The one or more non-transitory machine-readable media of claim 25, wherein comparing is performed manually.

27. The one or more non-transitory machine-readable media of claim 25, wherein comparing is performed automatically by identifying items in the image depicting the actual configuration using one or more image matching processes, and by comparing attributes of the identified items to attributes of items in the predefined configuration.

28. A system comprising a computing device, the computing device comprising:
- memory storing instructions that are executable;
- a graphics system for rendering images on a computer display screen; and
- one more processing devices to execute the instructions to perform operations comprising:
  - receiving information about a fixture, the information corresponding to a predefined configuration of items to be displayed on the fixture;
  - generating, on the computing device, data for a display using the information, the display depicting the predefined configuration and comprising a user interface, the user interface comprising a control configured to trigger multiple operations automatically;
  - presenting the display based on the data using the graphics system;
  - responsive to activation of the control, performing the multiple operations automatically, the multiple operations comprising:
    - controlling a camera associated with the computing device to capture an image depicting an actual configuration of the fixture;
    - associating metadata with the image, the metadata comprising searchable data that distinguishes the fixture from at least some other fixtures of like type, the metadata identifying at least some of the items in the actual configuration; and
    - sending the image, along with the metadata, over a network to a server that is remote from the computing device; and
  - sending, along with the image and the metadata, a message indicating whether the fixture is in compliance with the predefined configuration, the message being based on locations of at least some of the items in the actual configuration and locations of at least some of the items in the predefined configuration.

29. The system of claim 28, wherein the server is a first server, and the information is received from a second server that is different from the first server; and
wherein the operations further comprise receiving the metadata from the second server.

30. The system of claim 28, wherein the operations further comprise determining that the predefined configuration matches at least part of the actual configuration.

31. The system of claim 30, wherein determining is performed by comparing the predefined configuration to the actual configuration.

32. The system of claim 31, wherein comparing is performed manually.

33. The system of claim 31, wherein comparing is performed automatically by identifying items in the image depicting the actual configuration using one or more image matching processes, and by comparing attributes of the identified items to attributes of items in the predefined configuration.

* * * * *